(12) United States Patent
Lisewski et al.

(10) Patent No.: US 11,138,869 B2
(45) Date of Patent: Oct. 5, 2021

(54) ALARM SYSTEM

(71) Applicant: Carrier Corporation, Palm Beach Gardens, FL (US)

(72) Inventors: Tomasz Lisewski, Gdansk (PL); Radoslaw Rusek, Gdansk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/857,527

(22) Filed: Apr. 24, 2020

(65) Prior Publication Data

US 2020/0342747 A1    Oct. 29, 2020

(30) Foreign Application Priority Data

Apr. 24, 2019   (EP) ...................................... 19170903

(51) Int. Cl.
*G08B 19/00* (2006.01)
*G08B 29/18* (2006.01)
(Continued)

(52) U.S. Cl.
CPC ......... *G08B 29/186* (2013.01); *G06N 3/0454* (2013.01); *G06N 3/08* (2013.01); *G08B 13/1968* (2013.01); *G08B 21/22* (2013.01)

(58) Field of Classification Search
CPC ... A61B 5/7264; A61B 5/7203; A61B 5/7275; A61B 5/0205; A61B 5/7282;
(Continued)

(56) References Cited

U.S. PATENT DOCUMENTS 5,091,780 A    2/1992 Pomerleau
5,202,661 A    4/1993 Everett, Jr. et al.
(Continued)

FOREIGN PATENT DOCUMENTS

CN    105931402 A    9/2016
CN    106600869 A    4/2017
(Continued)

OTHER PUBLICATIONS

Badlani, Amit, et al., "Smart Home System Design based on Artificial Neural Networks", Proceedings of the World Congress on Engineering and Computer Science 2011, 6 pages.
(Continued)

*Primary Examiner* — Daniel Previl
(74) *Attorney, Agent, or Firm* — Cantor Colburn LLP

(57) ABSTRACT

A detector 10 for an alarm system 100 is operable to monitor a monitored area for disturbances. The detector includes a first neural network which has been trained to discriminate false alarms which should not result in an alarm being triggered by the alarm system 100 in a normal mode of operation from disturbances for which an alarm should be triggered in the normal mode of operation. The detector 10 is configured to receive an input from a user instructing the detector 10 to enter a training mode. The input includes a categorization setting instructing the detector 10 to label subsequent disturbances recorded whilst the detector 10 is in the training mode as either disturbances indicative of a false alarm, or as disturbances for which the alarm should be triggered in the normal mode of operation.

11 Claims, 3 Drawing Sheets

Figure 1:
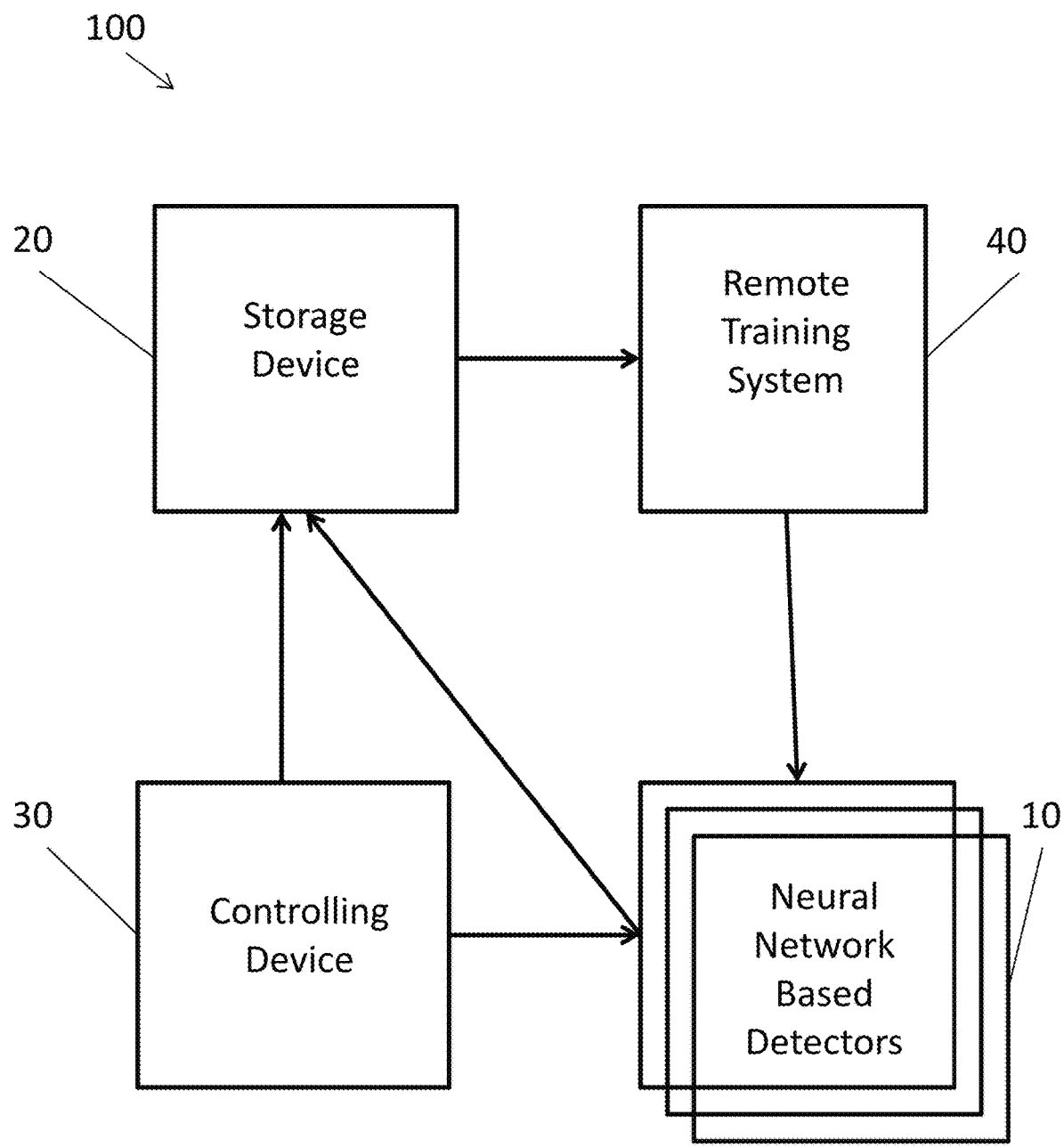

(51) Int. Cl.
*G06N 3/04* (2006.01)
*G06N 3/08* (2006.01)
*G08B 13/196* (2006.01)
*G08B 21/22* (2006.01)

(58) Field of Classification Search
CPC ... A61B 5/746; A61B 2560/0228; A61B 5/00;
A61B 5/0022; A61B 5/02438; A61B
5/0261; A61B 5/05; A61B 5/14551; A61B
5/282; A61B 5/291; A61B 5/366; A61B
5/6803; A61B 5/681; A61B 5/721; A61B
5/7221; A61B 5/726; A61B 5/7475; A61B
5/369; A61B 5/374; A61B 5/375; A61B
5/4094; A61B 2562/043; A61B 5/024;
A61B 5/0823; A61B 5/1116; A61B
5/1118; A61B 5/113; A61B 5/1455; A61B
5/412; A61B 5/445; A61B 5/447; A61B
5/4818; A61B 5/6887; A61B 5/6892;
A61B 5/7207; A61B 5/7285; B22D
2/001; G16H 40/63; A61N 1/36064;
A61N 1/36135; G06N 3/0454; G06N
3/08; G08B 13/1968; G08B 21/22; G08B
29/186; G08B 13/00; G08B 25/016;
A01M 23/00; A01M 31/002; G01C
21/165; G01S 19/49; G06Q 10/0631;
G06Q 30/018; G06Q 50/04; G06T
7/0004; G08G 1/20; Y02P 90/30
USPC .... 340/522, 540, 635, 654, 656, 568.1, 584,
340/500, 657, 636.19
See application file for complete search history.

(56) References Cited

U.S. PATENT DOCUMENTS

| | | | |
|---|---|---|---|
| 5,517,429 A | | 5/1996 | Harrison |
| 6,366,236 B1* | | 4/2002 | Farmer .................. G01S 7/417 |
| | | | 342/118 |
| 6,900,729 B2 | | 5/2005 | Paximadis et al. |
| 7,127,083 B2 | | 10/2006 | Han et al. |
| 7,447,334 B1 | | 11/2008 | Jiang et al. |
| 8,253,563 B2 | | 8/2012 | Burnard et al. |
| 8,384,542 B1 | | 2/2013 | Merrill et al. |
| 8,856,057 B2 | | 10/2014 | Ionson |
| 8,909,382 B1 | | 12/2014 | Malakuti |
| 8,909,926 B2 | | 12/2014 | Brandt et al. |
| 9,378,634 B1 | | 6/2016 | Kashyap et al. |
| 9,520,049 B2 | | 12/2016 | Malhotra et al. |
| 9,652,917 B2 | | 5/2017 | Johnson et al. |
| 9,683,392 B1 | | 6/2017 | Cheng et al. |
| 2002/0057184 A1* | | 5/2002 | Davidkhanian ........ B22D 2/001 |
| | | | 336/233 |
| 2004/0155777 A1* | | 8/2004 | Mitchell ............ G08B 13/1427 |
| | | | 340/568.1 |
| 2009/0033505 A1* | | 2/2009 | Jones .................... G08B 25/10 |
| | | | 340/584 |
| 2015/0039543 A1* | | 2/2015 | Athmanathan ..... H04L 63/1425 |
| | | | 706/20 |
| 2015/0366518 A1* | | 12/2015 | Sampson ............. A61B 5/0261 |
| | | | 600/301 |
| 2016/0189505 A1 | | 6/2016 | Boettcher et al. |
| 2017/0293804 A1 | | 10/2017 | Min et al. |
| 2018/0000385 A1 | | 1/2018 | Heaton et al. |
| 2018/0308475 A1 | | 10/2018 | Locke et al. |
| 2018/0315200 A1 | | 11/2018 | Davydov et al. |

FOREIGN PATENT DOCUMENTS

| | | |
|---|---|---|
| CN | 107067605 A | 8/2017 |
| CN | 107146355 A | 9/2017 |
| CN | 107454192 A | 12/2017 |
| CN | 109035662 A | 12/2018 |
| CN | 109118689 A | 1/2019 |
| CN | 109410496 A | 3/2019 |
| EP | 0897566 A1 | 2/1999 |
| WO | 2018167349 A1 | 9/2018 |
| WO | 2018195546 A1 | 10/2018 |

OTHER PUBLICATIONS

European Search Report for application EP 19170903.9, dated Oct. 9, 2019, 9 pages.

Linda, Ondrej, et al., "Neural Network Based Intrusion Detection System for Critical Infrastructures", 2009 International Joint Conference on Neural Networks, 9 pages.

Naik, Anil, "Artificial Neural Network for Home Security System(ANNHSS)", Yuva Engineers, May 1, 2010, 12 pages.

Shareef, Israa, "Desing and Implementation of Smart Security System Based on Artificial Neural Network", ARPN Journal of Engineering and Applied Sciences 2016, 11 pages.

* cited by examiner

ALARM SYSTEM

FOREIGN PRIORITY

This application claims priority to European Patent Application No. 19170903.9, filed Apr. 24, 2019, and all the benefits accruing therefrom under 35 U.S.C. § 119, the contents of which in its entirety are herein incorporated by reference.

BACKGROUND

The present invention relates to a detector for an alarm system which comprises a neural network, a training system for an alarm system, and a method of training an alarm system. The detector's neural network is trained to discriminate false alarms which should not result in an alarm being triggered by the alarm system in a normal mode of operation from disturbances for which an alarm should be triggered in the normal mode of operation. The present invention may be particularly useful for, but is not limited to, an intruder alarm system for detecting intruders in a monitored area.

It is commonplace for certain areas to be equipped with alarm systems. Such areas include private homes, offices, shops or other places of business. When these areas are unattended it is typical to arm the alarm system in order to detect the presence of unwanted disturbances such as intruders.

It is desirable to reduce the rate of false alarms in alarm systems. False alarms may cause a delay in law enforcement being able to respond to a genuine emergency due to dealing with the false alarm. Some systems are registered with local law enforcement and law enforcement will attend the premises when the alarm is triggered. If false alarms are too frequent, the premises may be struck off the register and law enforcement will no longer attend the premises when the alarm is triggered. Similarly, the alarm may be ignored by neighbours if it is activated too frequently. Costs may also be incurred if the system is a monitored system and too many false alarms are triggered. The user may also become reluctant to arm the alarm due to the excessive number of false alarms. This then leaves the area vulnerable to intruders.

It will be appreciated that it is also important to reduce the occurrences of a failure to trigger the alarm when a genuine intruder is present.

Many conventional security systems use motion detectors that detect passive infrared (PIR) signals generated by body heat (infrared energy). By "passive" it is meant that the sensors of the systems detect signals produced by other bodies but do not emit these signals themselves. Passive infrared sensors are widely used in home security systems. The sensor of a typical system can detect heat and movement of heat sources in the region which it monitors, dividing this region into a protective "grid". If a moving object is present in too many grid zones and/or the infrared energy levels change rapidly across the grid zones, the sensors are tripped, thus triggering the alarm.

Other security systems utilize active signals such as ultrasound or radio frequency fields. By "active" it is meant that sensors emit signals and detect a corresponding reflected signal. For example, sensors may emit radio pulses and measure the reflection from a moving object in order to detect its movement. Sensors can also emit infrared signals from an LED following a similar principle.

Typical alarm systems, such as household alarms systems, are designed to detect a human intruder within the monitored area. However, other disturbances may also trigger the alarm. For example, pets, robot vacuum cleaners, moving fans, or similar devices may trigger the alarm. Movement of objects in the monitored areas caused by draughts from heating systems, air conditioning systems or open windows/doors may also trigger the alarm. Additionally, mechanical vibrations, electromagnetic disturbances, hot airflow and white light radiation can trigger the alarm.

Typical security systems are tested extensively prior to selling to a customer. Testing typically involves simulated scenarios in a test area. These simulations could for example be an intruder breaking into a house or shop. The simulations are run in a controlled environment to allow the security system to detect the intruder and trigger an appropriate response.

Testing continues until the security system achieves a required level of accuracy. A certain level is required before the alarm can be certified for use. The testing of security systems can be a long process, and the simulated scenarios are often not perfect representations of real-world situations. When a security system is installed, there may be many other environment factors present that are not accounted for in the simulated scenarios.

There is therefore a need for a detector and associated alarm system to achieve better accuracy in an installed location. It is also desirable to achieve this increased accuracy without the cost of increased testing time, and so it is advantageous to provide a detector and associated alarm system that can be brought to market quickly.

SUMMARY

According to a first aspect, the present invention provides a detector for an alarm system, wherein the detector is operable to monitor a monitored area for disturbances, wherein the detector comprises a first neural network defined by a topology and a first set of parameters, wherein the first neural network has been trained to discriminate false alarms which should not result in an alarm being triggered by the alarm system in a normal mode of operation from disturbances for which an alarm should be triggered in the normal mode of operation, wherein the detector is configured to receive an input from a user instructing the detector to enter a training mode, and wherein the input includes a categorization setting instructing the detector to label subsequent disturbances recorded whilst the detector is in the training mode as either disturbances indicative of a false alarm, or as disturbances for which the alarm should be triggered in the normal mode of operation.

Thus, the user can set the detector into a training mode of operation. When doing so, the user may set a categorization setting which is applicable for that particular session. The categorization setting may either instruct the detector to label subsequent disturbances recorded whilst the detector is in the training mode as disturbances indicative of a false alarm (a "false alarm" training mode), or as disturbances for which the alarm should be triggered in the normal mode of operation (a "genuine alarm" training mode).

For example, the user may secure the monitored area without people inside, such that the monitored area is inaccessible to people, and then may set the detector into the training mode. When setting the detector into the training mode in such a situation, the user may set the categorization setting in order to specify that any disturbances occurring whilst the detector is in the training mode should be labelled as indicative of a false alarm (i.e. disturbances for which the alarm should not be activated when in the normal mode of operation). In effect, this establishes a base-line of environmental factors which could potentially give rise to false alarms. These environmental factors may be specific to the particular monitored area in which the detector is installed.

Alternatively, the user may set the detector into the training mode and may set the categorization setting in order to specify that any disturbances occurring whilst the alarm is in the training mode should be labelled as disturbances for which the alarm should be triggered in the normal mode of operation (the "genuine alarm" training mode). The user can then simulate various activities which might be carried out by an intruder (for example, opening a window or door and moving around the monitored area).

The detector may comprise a communications interface configured to send and receive information. The communications interface may be any wired or wireless interface. Examples of wireless interfaces include WiFi, Bluetooth, ZigBee etc.

The detector may be configured to detect at least one of: infra-red radiation, sound waves, ultrasonic waves, and radio frequency waves. For example, the detector may be a PIR sensor. The detector may utilize active signals such as ultrasound, infrared or radar, and may emit pulsed signals and measure the reflection off a moving object in order to detect its movement.

The detector may therefore comprise at least one transducer operable to receive at least one of: infra-red radiation, sound waves, ultrasonic waves and radio frequency waves and operable to convert the received quantity into an electrical signal.

The detector may comprise at least one transducer operable to generate at least one of: infra-red radiation, sound waves, ultrasonic waves and radio frequency waves.

The detector may convert the detected quantity into electrical signals. These electrical signals may be processed to extract characteristic parameters from the electrical signals. The characteristic parameters may include at least one of frequency, phase shift, time delay, maximum, minimum and average value, amplitude, phase spectrum components, intensity and duration, for example.

The detector may comprise a processor operable to process electrical signals received by the detector.

As well as having a training mode, the detector may be operable in a normal mode of operation. The normal mode may correspond to the detector being armed, i.e. operable to detect disturbances and generate an alarm if appropriate (i.e. if the disturbance is not dismissed as a false alarm). Such a normal mode may for example be activated when the monitored space is secure and there are no people in the monitored area. For example, where the detector is provided in a home, the detector may be set to operate in the normal mode (i.e. the detector may be armed) when the inhabitants leave the home for the day, or when the inhabitants go to bed for the night.

The detector may also have an inactive mode (i.e. an off-mode). Such a mode will generally be set when there are authorised people in the monitored area. For example, where the detector is provided in a home, the detector may be set to operate in the inactive mode when the inhabitants are present and active in the house during the day time.

In the normal mode of operation, the detector may be configured to input the characteristic parameters of the electrical signals into the neural network and to compute the neural network response to determine if the detected disturbance is a false alarm (and hence can be disregarded, without triggering an alarm) or if the disturbance may potentially be caused by an intruder, such that the alarm should be triggered.

The detector may be configured to send the characteristic parameters of the electrical signals and the associated label (i.e. labelled as a false alarm, or labelled as a disturbance for which the alarm should be triggered in the normal mode of operation, depending on the categorization setting chosen when setting the training mode) to a storage device when in the training mode.

Optionally, in the training mode the detector is configured to input the characteristic parameters of the electrical signals into the neural network and to compute the neural network response to determine the "expected response"—i.e. to determine if the detected disturbance would be considered a false alarm when the alarm is operating in the normal mode, or if the disturbance would be considered as potentially being caused by an intruder, such that the alarm should be triggered in the normal mode. Then, the detector may compare the "expected response" to the categorization setting, and may only send the characteristic parameters of the electrical signals and the associated label to the storage device if the two differ. For example, if the "expected response" is that the disturbance is potentially caused by an intruder, but the categorization setting is "false alarm", then the detector may send the characteristic parameters of the electrical signals and the associated label to the storage device. However, if the "expected response" is that the disturbance is a false alarm, and the categorization setting is "false alarm", then the detector may not send the characteristic parameters of the electrical signals and the associated label to the storage device.

The invention extends to an alarm system comprising the detector of the first aspect, optionally with any of the optional features described above, and a storage device configured to store the characteristic parameters of the electrical signals and the associated label (i.e. labelled as a false alarm, or labelled as a disturbance for which the alarm should be triggered in the normal mode of operation, depending on the categorization setting chosen when setting the training mode).

The alarm system may comprise a plurality of detectors. Each detector may have its own corresponding neural network. Each detector can be separately trained (i.e. each detector can be put into a training mode independently of the others). Alternatively, the system may be set up so that all of the detectors in the system are in the training mode at the same time.

One possibility is to have the storage device as part of the detector. However, this increases the size and costs of the detector. An alternative is to provide the storage device remotely from the detector. The storage device and detector may for example communicate with each other via a local network (wired, or wireless). In that case, the storage device may be in the vicinity of the detector and monitored area. Or, the storage device and detector may for example communicate with each other via the internet. In this case, the storage device may be located at a large distance from the detector.

The storage device may be any suitable means for storage of information, including for example a solid state drive (SSD), a hard disk drive (HDD) or a cloud service.

The storage device may comprise a communications interface configured to send and receive information. The communications interface may be any wired or wireless interface. Examples of wireless interfaces include WiFi, Bluetooth, ZigBee etc.

The alarm system may comprise a user interface which allows the user to put the detector into the training mode. The user interface may allow the user to set a categorization setting which indicates that subsequent disturbances recorded whilst the detector is in the training mode should be labelled as either disturbances indicative of a false alarm, or as disturbances for which the alarm should be triggered in the normal mode of operation (a "genuine alarm"). The user interface may be configured to be run by a user device having a communications interface configured to send and receive information.

The user device may for example be a mobile telephone, a tablet, a laptop or desktop computer, a smart watch or any similar device. The user interface may comprise an application or software program which is run by the user device.

The alarm system may comprise a training system, wherein the training system comprises a communications interface configured to send and receive information, wherein the training system comprises a second neural network having the same topology as the first neural network and defined by a second set of parameters, wherein the second neural network has been trained to discriminate false alarms which should not result in an alarm being triggered by the alarm system in a normal mode of operation from disturbances for which an alarm should be triggered in the normal mode of operation, wherein the training system stores an existing training set of disturbances, the set of disturbances in the existing training set being labelled as either disturbances indicative of a false alarm, or as disturbances for which the alarm should be triggered in the normal mode of operation of the alarm system ("genuine alarms"), wherein the training system is configured to: receive a set of new labelled disturbances recorded by the detector; add the set of new labelled disturbances to the existing training set of disturbances to form an updated training set; retrain the second neural network using the updated training set to generate an updated set of neural network parameters; and send the updated set of neural network parameters to the detector.

The training system may be provided remotely from the detector (and the monitored area). In such a case, the training system may communicate with other components of the alarm system via the internet.

The training system may comprise a processor and a storage medium such as a SSD, HDD or a cloud service.

The "topology" of the neural network refers to the way in which the neurons of the neural network are connected. The first and second neural networks use multiple layers and various activation functions including ramp or sigmoid function. For example, the neural network may be a two layer feed forward neural network with unipolar activation functions.

The alarm system may be an intruder alarm system trained to detect intruders (for example, human intruders) in the monitored area.

It is possible that the security system could be in the "false alarm" training mode when a genuine disturbance occurs, caused by an intruder. In this instance, this intrusion will be labelled as a false alarm. If this data is subsequently used to retrain the neural network, the performance of the alarm system could degrade. To avoid this, the user interface may have a review function, allowing the user to confirm that the recorded disturbances do not include any genuine disturbances. Only once the data has been validated in this way is the information sent to the remote training system.

According to a further aspect of the invention, there is provided a method of training an alarm system comprising: installing a detector to monitor a monitored area for disturbances, wherein the detector comprises a first neural network defined by a topology and a first set of parameters, wherein the neural network has been trained to discriminate false alarms which should not result in an alarm being triggered by the alarm system in a normal mode of operation from disturbances for which an alarm should be triggered in the normal mode of operation; instructing the detector to operate in a training mode; instructing the detector to label disturbances according to a categorization setting, wherein the categorization setting indicates whether the disturbances should be labelled as either false alarms or as disturbances for which an alarm should be triggered in a normal mode of operation ("genuine alarms"); recording disturbances, and labelling them according to the categorization setting to generate a set of labelled disturbances; sending the set of labelled disturbances to a training system comprising a second neural network having the same topology as the first neural network; adding the set of labelled disturbances to an existing training set of disturbances to form an updated training set; retraining the second neural network using the updated training set to generate an updated set of neural network parameters; sending the updated set of neural network parameters to the detector; andreplacing the first set of neural network parameters with the updated set of neural network parameters in the first neural network.

The training system may be provided remotely from the detector (and the monitored area). In such a case, the training system may communicate with other components of the alarm system via the internet.

Prior to sending the set of labelled disturbances to the training system, the set of labelled disturbances may be stored by a storage device, as disclosed above.

The alarm system may be trained iteratively, such that the second neural network can be retrained multiple times, each time generating a new updated set of neural network parameters.

The alarm system may be retrained after each training session. The user may run a training session following a false alarm, or following the failure to detect an intruder, for example.

Alternatively, the alarm system may be retrained when the set of labelled disturbances comprises a number of disturbances that exceeds a predetermined threshold.

The alarm system described in the foregoing may be configured to carry out the method described above (optionally including any of the optional features described). The foregoing method may be carried out by the alarm system described in the foregoing (optionally including any of the optional features described).

According to a further aspect of the invention, there is provided a user interface for an alarm system, wherein the user interface allows the user to put the alarm system into a training mode, and wherein the user interface allows the user to set a categorization setting which indicates that subsequent disturbances recorded whilst the detector is in the training mode should be labelled as either disturbances indicative of a false alarm, or as disturbances for which the alarm should be triggered in the normal mode of operation ("genuine alarms").

The user device may for example be a mobile telephone, a tablet, a laptop or desktop computer, a smart watch or any similar device. The user interface may comprise an application or software program which is run by the user device.

According to a further aspect of the invention, there is provided a training system for an alarm system, wherein the training system comprises a trained neural network having a set of parameters, wherein the trained neural network has been trained to discriminate false alarms which should not result in an alarm being triggered by the alarm system in a normal mode of operation from disturbances for which an alarm should be triggered in the normal mode of operation, wherein the training system stores an existing training set of disturbances, the disturbances in the existing training set being labelled as either disturbances indicative of a false alarm, or as disturbances for which the alarm should be triggered in the normal mode of operation of the alarm system, wherein the training system is configured to: receive a set of new labelled disturbances recorded by a detector of the alarm system; add the set of new labelled disturbances to the existing training set of disturbances to form an updated training set; retrain the trained neural network using the updated training set to generate an updated set of neural network parameters; and send the updated set of neural network parameters to the detector.

Embodiments of the invention may allow for a detector and/or associated alarm system that can achieve improved accuracy in an installed location, due to the learning abilities of the detector and/or associated alarm system. That is, the detector and alarm system may effectively be customized to the specific environment in which they are installed. The detector and the alarm system may have the capability of learning the base-line of environmental factors which could potentially give rise to false alarms in the specific installed location. Moreover, the detector and the alarm system may have the capability of allowing the user to simulate various activities which might be carried out by an intruder in the specific installed location.

DRAWING DESCRIPTION

Figure 2:
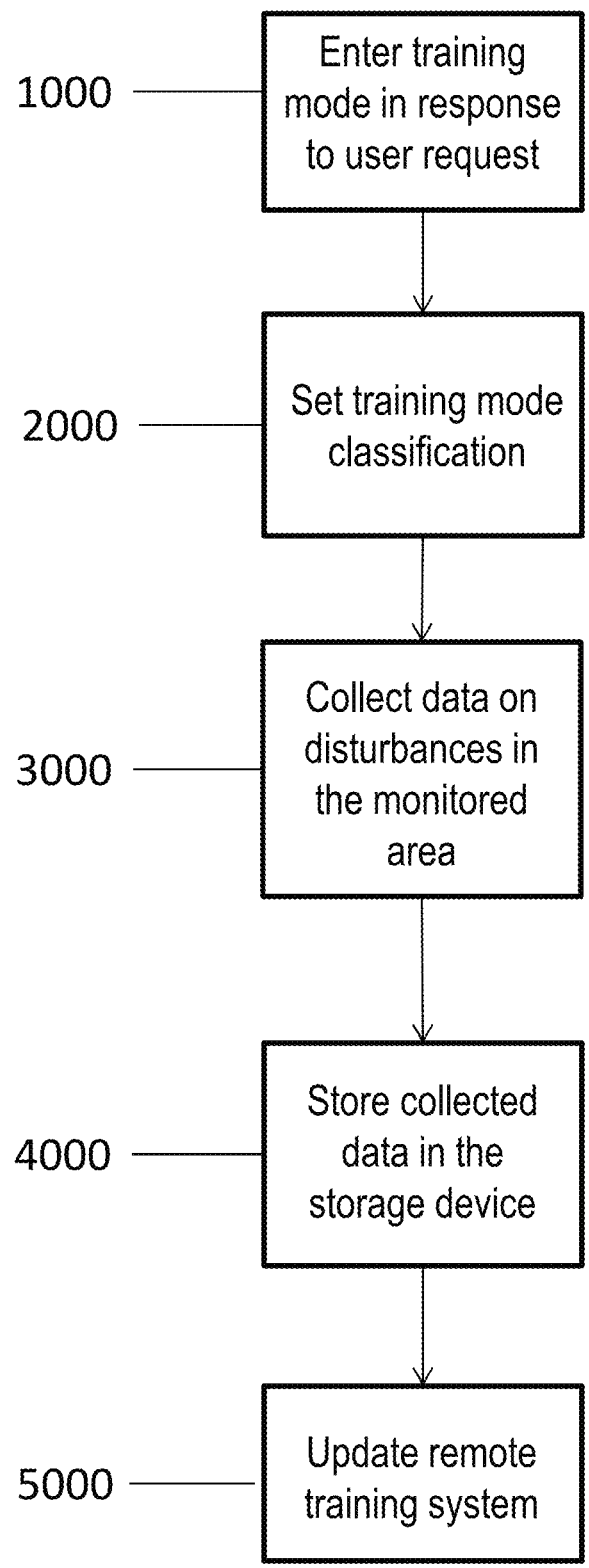
Figure 3:
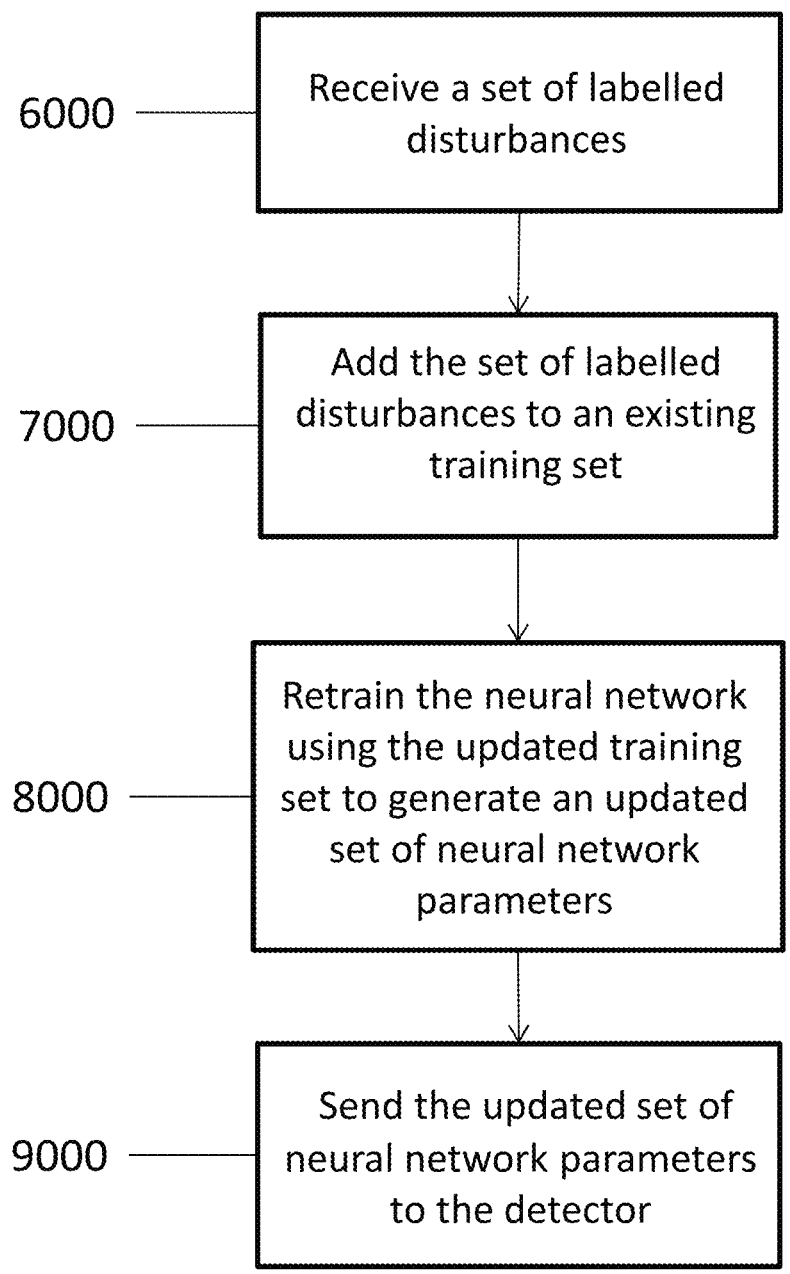

Certain embodiments of the present invention will now be described, by way of example only, with reference to the accompanying drawings, in which:

FIG. 1 shows a security system;
FIG. 2 shows steps carried out by a detector; and
FIG. 3 shows steps carried out by a training system.

DETAILED DESCRIPTION

FIG. 1 shows a security system 100. The system comprises a plurality of neural network based detectors 10, a storage device 20, a controlling device 30 and a remote training system 40.

The controlling device 30 in this case is a mobile phone, but may for example be a tablet, laptop, desktop PC, a smart watch or any similar device. The controlling device 30 comprises a user interface allowing the user to put the detectors 10 into a training mode.

The security system 100 of FIG. 1 is for use in any type of area to be monitored. The system can be used in the user's home, alternatively it can be used in a public area or a place of business such as an office or a shop or any other area where it would be desirable to detect an unauthorised intruder. The user of the system 100 may therefore be the resident of the home or the proprietor of the place of business.

The plurality of neural network based detectors 10 can be any type of detector that is able to detect the presence of an intruder within the monitored area. For example the detectors can comprise infra-red, radar, ultrasound, acoustic or optical sensors. The plurality of neural network based detectors 10 can also comprise a combination of different sensors depending on the type of unwanted disturbance to be detected in the monitored area.

The plurality of neural network based detectors 10 are positioned throughout the monitored area. The number of neural network based detectors 10 required will depend on the size and configuration of the monitored area.

Typically the monitored area may comprise multiple sub-areas such as individual rooms within a home or office. Depending on the size of a particular sub-area, multiple neural network based detectors 10 may be required to provide sufficient coverage to monitor the sub-area. Each of the individual neural network based detectors 10 may comprise the same type of sensor. Alternatively, each sub-area may have multiple neural network based detectors 10, where each detector is configured to measure a different property. The particular sensor type may be chosen in consideration of the expected environmental considerations in the monitored area.

In operation the neural network based detectors 10 monitor the monitored area for disturbances. The neural network based detectors 10 comprise a neural network trained to discriminate between false alarms (for which an alarm should not be triggered) and genuine disturbances (for example, disturbances caused by an intruder). Prior to installation in the monitored area, the neural networks present in the neural network based detectors 10 are trained on simulated scenarios. However, such scenarios are limited in number, and do not take into account the particular conditions of the specific area in which the detectors 10 are installed. As a result, false alarms may occur.

Following installation, and/or after the occurrence of a false alarm, the user may decide to retrain the neural networks present in the neural network based detectors 10 in the system 100.

The user uses the controlling device 30 to set the neural network based detectors 10 into the training mode. Then, the user sets a categorization setting to "false alarms" or "genuine alarms", depending on whether the user wishes to train the neural network based detectors 10 to learn the background environmental conditions in the monitored area (i.e. to learn "false alarms") or whether the user wishes to simulate "genuine alarms".

The purpose of the "false alarm" training mode is to record the data for ambient conditions within the monitored area and determine any routine disturbances that may occur when the security system is activated. This allows the system 100 to learn the expected or acceptable disturbances for which an alarm should not be triggered.

If the user sets the categorization setting to "false alarms", then the user should ensure that the monitored area is secure and that there are no people present in the monitored area. Then, the user can leave the system 100 running in the training mode, allowing the neural network based detectors 10 to accumulate date on any disturbances that occur. Such disturbances may be caused by pets (for example, cats or dogs), moving household devices (robot vacuum cleaners or rotating fans, for example) or any object that is caused to move by air currents, hot air flow, white light, electromagnetic or mechanical disturbances etc.

The electrical signals measured by the neural network based detectors 10 are processed to determine characteristics parameters of the electrical signals. The characteristic parameters of the accumulated disturbances are tagged as "false alarms" and are sent to the storage device 20.

From the storage device 20, the characteristic parameters of the accumulated disturbances and "false alarm" tag are sent to the remote training system 40.

The remote training system 40 comprises a trained neural network having the same topology as the neural network of the neural network based detectors 10. The remote training system 40 stores an existing training set of disturbances, the disturbances in the existing training set being labelled as either "false alarms" or "genuine alarms" and the trained neural network has been trained to discriminate between these. The remote training system 40 receives the set of new labelled disturbances recorded by the neural network based detectors 10 of the alarm system and adds these to the existing training set. Then, the remote training system 40 retrains the trained neural network using the updated training set to generate an updated set of neural network parameters. The updated set of neural network parameters are then sent to the neural network based detectors 10.

The neural network based detectors 10 then benefit from the retrained neural network, which has been retrained using the data accumulated during the "false alarm" training mode.

The user can carry out this process following the installation of the alarm system 100. The user can repeat this process until they are satisfied with the accuracy of the alarm system 100. The user may also repeat the process if the usual conditions in the monitored area change. For example, the user might run the training mode if there is a new pet present in the monitored area, or if a new moveable device is used in the area. Additionally, the user may repeat the training process following a false alarm, or following the failure of the system to detect a genuine intruder.

The purpose of the "genuine alarm" training mode is to simulate and record activities which might be carried out by an intruder, for example, entering through a door or window, and moving through the monitored area. The particular location of doors, windows etc. in the monitored area may affect how sensitive the alarm is to intruders, and so the "genuine alarm" training mode can be used to improve accuracy in detecting intruders.

If the user sets the categorization setting to "genuine alarms", then the user should simulate intruder activity, allowing the neural network based detectors 10 to accumulate date on the disturbances that occur.

The electrical signals measured by the neural network based detectors 10 are processed to determine characteristic parameters of the electrical signals. The characteristic parameters of the accumulated disturbances are tagged as "genuine alarms" and are sent to the storage device 20.

From the storage device 20, the characteristic parameters of the accumulated disturbances and "genuine alarm" tag are sent to the remote training system 40.

The remote training system 40 receives the set of new labelled disturbances and adds these to the existing training set. Then, the remote training system 40 retrains the trained neural network using the updated training set to generate an updated set of neural network parameters. The updated set of neural network parameters are then sent to the neural network based detectors 10.

The neural network based detectors 10 then benefit from the retrained neural network, which has been retrained using the data accumulated during the "genuine alarm" training mode.

In this example, the neural network based detectors 10, storage device 20 and controlling device 30 communicate over a local WiFi network. The remote training system 40 communicates with the network based detectors 10 and storage device 20 via the Internet.

In some cases the training mode will not encompass every possible type of disturbance and therefore false alarms may still occur.

FIG. 2 shows the method for training the security system of the present invention as carried out by the neural network based detectors 10 and storage device 30. Using the example of a house, once the security system 100 has been installed within the house, which may involve positioning the neural network based detectors in each room of the house, the user activates the training mode via the user interface on the controlling device 30 at block 1000.

The user sets the training mode classification at block 2000. In this example the user selects the classification as "false alarm". In the example of a house, the user would request training mode and false alarm upon leaving the house for the day.

The neural network based detectors 10 will then record disturbances throughout the day (block 3000). The disturbances may be caused by the normal ambient conditions within the particular house.

This collected data will then be stored in the storage device (block 4000) as "false alarm" data.

This newly stored data will then be sent to the remote training system 40 at block 5000.

When the user returns home the user interface on the controlling device 30 is used to deactivate the training mode.

Further steps of the method of training the alarm system 100 are shown in FIG. 3—these steps are carried out by the remote training system 40.

At block 6000 the remote training system 40 receives a set of labelled disturbances and adds the set of labelled disturbances to an existing training set (block 7000). Then, at block 8000, the neural network is retrained using the updated training set to generate an updated set of neural network parameters. The updated set of neural network parameters is then sent to the detector (block 9000).

It is possible that the security system could be in the "false alarm" training mode when a genuine disturbance occurs, caused by an intruder. In this instance, this intrusion will be labelled as a false alarm. If this data is subsequently used to retrain the neural network, the performance of the alarm system could degrade. To avoid this, the user interface may have a review function, allowing the user to confirm that the recorded disturbances do not include any genuine disturbances. Only once the data has been validated in this way is the information sent to the remote training system.

What is claimed:

1. An alarm system comprising a detector, wherein the detector is operable to monitor a monitored area for disturbances,
    wherein the detector comprises a first neural network defined by a topology and a first set of parameters, wherein the first neural network has been trained to discriminate false alarms which should not result in an alarm being triggered by the alarm system in a normal mode of operation from disturbances in the monitored area for which an alarm should be triggered in the normal mode of operation,
    wherein the detector is configured to receive an input from a user instructing the detector to enter a training mode, and wherein the input includes a categorization setting instructing the detector to label subsequent disturbances recorded whilst the detector is in the training mode as either disturbances indicative of a false alarm, or as disturbances for which the alarm should be triggered in the normal mode of operation;
    wherein the alarm system further comprises:
    a storage device configured to store the characteristic parameters of the electrical signals of the labelled disturbances recorded by the detector, wherein the storage device comprises a communications interface configured to send and receive information; and a remote training system, wherein the remote training system comprises a communications interface configured to send and receive information, wherein the remote training system comprises a second neural network having the same topology as the first neural network and defined by a second set of parameters, wherein the second neural network has been trained to discriminate false alarms which should not result in an alarm being triggered by the alarm system in a normal mode of operation from disturbances for which an alarm should be triggered in the normal mode of operation, wherein the remote training system stores an existing training set of disturbances, the set of disturbances in the existing training set being labelled as either disturbances indicative of a false alarm, or as disturbances for which the alarm should be triggered in the normal mode of operation of the alarm system, wherein the remote training system is configured to:

receive a set of new labelled disturbances recorded by the detector;

add the set of new labelled disturbances to the existing training set of disturbances to form an updated training set;

retrain the second neural network using the updated training set to generate an updated set of neural network parameters; and send the updated set of neural network parameters to the detector.

2. The alarm system according to claim 1, wherein the detector comprises a communications interface configured to send and receive information.

3. The alarm system according to claim 1, wherein the detector is configured to detect at least one of: infra-red radiation, sound waves, ultrasonic waves and radio frequency waves, and is configured to convert the detected quantity into electrical signals.

4. The alarm system according to claim 3, wherein the detector is configured to extract characteristic parameters from the electrical signals.

5. The alarm system according to claim 4, wherein in a normal mode of operation, the detector is configured to input the characteristic parameters of the electrical signals into the neural network and to compute the neural network response to determine if the detected disturbance is a false alarm or if the alarm should be triggered.

6. The alarm system according to claim 4, wherein when in the training mode, the detector is configured to send the characteristic parameters of the electrical signals to a storage device.

7. The alarm system according to claim 1, comprising a user interface which allows the user to put the detector into a training mode, and wherein the user interface allows the user to set a categorization setting which indicates that subsequent disturbances recorded whilst the detector is in the training mode should be labelled as either disturbances indicative of a false alarm, or as disturbances for which the alarm should be triggered in the normal mode of operation, wherein the user interface is configured to be run by a user device having a communications interface configured to send and receive information.

8. The alarm system according to claim 1, wherein the alarm system is an intruder alarm system trained to detect intruders in the monitored area.

9. A method of training an alarm system comprising:

installing a detector to monitor a monitored area for disturbances, wherein the detector comprises a first neural network defined by a topology and a first set of parameters, wherein the neural network has been trained to discriminate false alarms which should not result in an alarm being triggered by the alarm system in a normal mode of operation from disturbances for which an alarm should be triggered in the normal mode of operation;

instructing the detector to operate in a training mode;

instructing the detector to label disturbances according to a categorization setting, wherein the categorization setting indicates whether the disturbances should be labelled as either false alarms or as disturbances for which an alarm should be triggered in a normal mode of operation;

recording disturbances, and labelling them according to the categorization setting to generate a set of labelled disturbances;

sending the set of labelled disturbances to a remote training system comprising a second neural network having the same topology as the first neural network;

adding the set of labelled disturbances to an existing training set of disturbances to form an updated training set;

retraining the second neural network using the updated training set to generate an updated set of neural network parameters;

sending the updated set of neural network parameters to the detector; and replacing the first set of neural network parameters with the updated set of neural network parameters in the first neural network.

10. A method according to claim 9, wherein the alarm system can be trained iteratively, such that the second neural network can be retrained multiple times, each time generating a new updated set of neural network parameters.

11. A method according to claim 9, wherein the alarm system can be retrained after each training session, or wherein the alarm system can be retrained when the set of labelled disturbances comprises a number of disturbances that exceeds a predetermined threshold.

* * * * *